Aug. 3, 1965

J. H. SADLER 3,198,237

TORCH FOR LIQUID FUEL BURNERS

Filed Oct. 14, 1963

INVENTOR.
John H. Sadler

ATTORNEY

United States Patent Office 3,198,237
Patented Aug. 3, 1965

3,198,237
TORCH FOR LIQUID FUEL BURNERS
John H. Sadler, Manchester, Conn., assignor of one-half to William H. Byrne, New York, N.Y.
Filed Oct. 14, 1963, Ser. No. 315,882
4 Claims. (Cl. 158—76)

This invention relates to a torch for starting the operation of liquid fuel burners and more particularly concerns starting torches which are associated with stoves, heaters, furnaces and the like.

In Patent 2,925,126, granted February 16, 1960, there is described a torch for starting stoves and the like; such torch being distinguished by a tubular body and a rod disposed within the body, the body and rod having loosely mating thread portions whereby the rod may be advanced relative to the body to provide needle valve means at a nozzle or orifice end of the body. The loose fit between the threaded portions of the torch body and rod provides a helical passage for the movement therethrough of a mixture of fuel oil and air under pressure, whereby to insure thorough mixing and emission of an atomized spray at the orifice or nozzle end of the torch body.

However, it has been found that with the torch of the aforesaid Patent 2,925,126, the adjustment of the rod relative to the torch body is highly critical so as to assure precision location of the threads on the torch body relative to the threads on the rod so as to provide a proper helical passage for the fuel-air mixture. Furthermore, if the torch body and rod are not properly related, the flow of the mixture may be impeded or cut off entirely.

In addition, the patented device presents some difficulties in the ignition thereof and the flame may be somewhat uneven. Also, in cold weather some difficulties may be encountered when using somewhat heavy fuel oil.

Accordingly, an object of this invention is to provide an improved starting torch of the tubular body-rod type, which is of reduced sensitivity in adjustment and operation; which provides a uniform hot flame; which is readily ignited at all temperatures and provides for a turbulence in the mixture of fuel and air as the same moves toward the nozzle which insures optimum admixture of the fuel and air so as to provide a flame which will rapidly heat the generator of the stove with which the torch is associated.

Other objects of this invention will in part be obvious and in part hereinafter pointed out.

Figure 1:
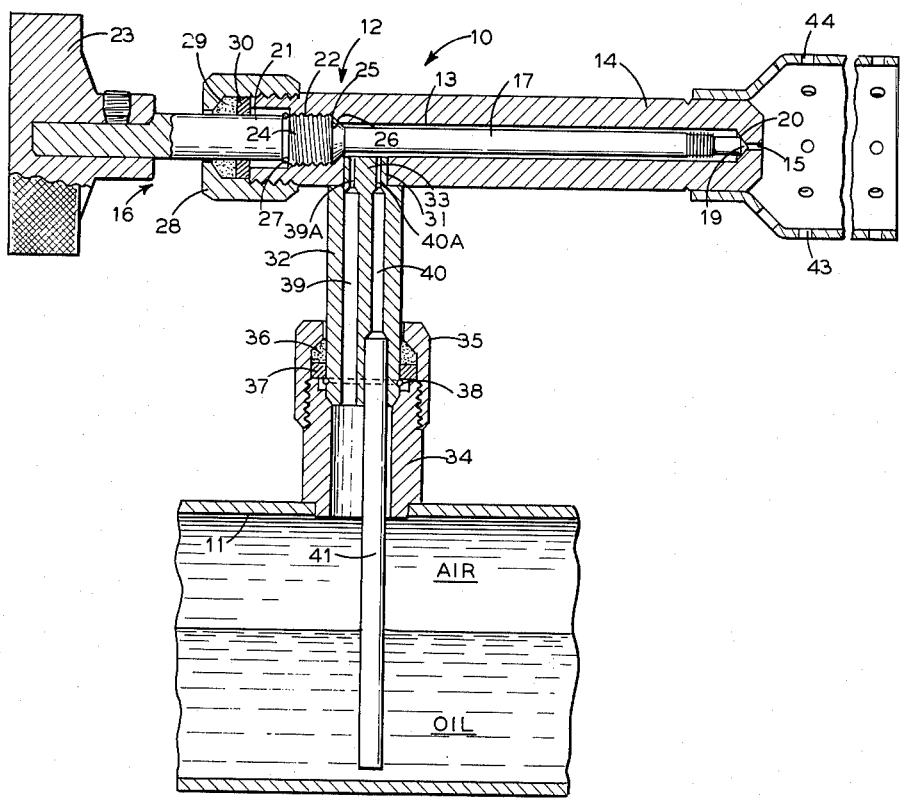
Figure 2:
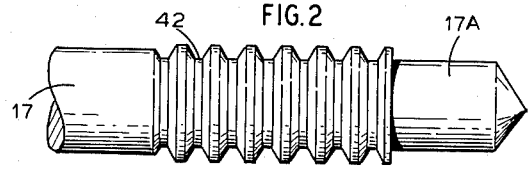
Figure 3:
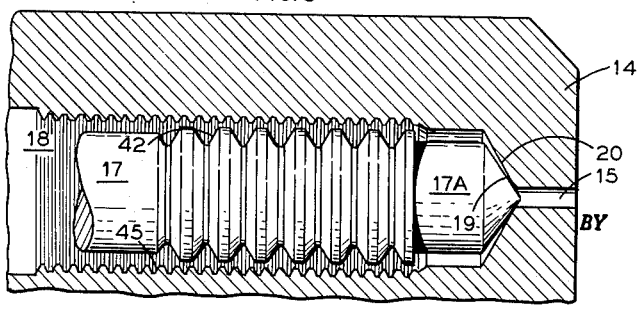

In the drawing, FIG. 1 is a longitudinal sectional view showing starting torch embodying the invention;

FIG. 2 is an enlarged, partial side elevational view of a stem portion of the device; and FIG. 3 is an enlarged, partial side elevational view showing a modified form of the invention in respect to the stem-tubular body assembly.

The device of the instant invention comprises a tubular torch body and an axially disposed valve rod which may be advanced or retracted to adjust an orifice at the forward end of the body; the rod being furthermore effective to induce a high degree of turbulence in a mixture of liquid fuel and air as the same passes through the torch body toward the orifice thereof, whereby the mixture issuing from the orifice in an atomized condition, may be readily ignited as by a burning match. The resultant flame from the torch is then directed against the generator portion of a stove or the like so as to vaporize the fuel and form a combustible fuel in vapor form for operating the stove.

Thus, as shown in FIG. 1, 10 designates a starting torch embodying the invention, said torch being mounted on a fuel tank indicated at 11. The tank 11 is of a conventional pressure type having the usual pump, not shown, to maintain the pressure within the tank at suitable values.

The torch 10 comprises a tubular body 12 having an axial bore 13 which communicates at the forward end portion 14 of body 12 with a restricted orifice or nozzle 15. A valve rod generally indicated at 16 is axially disposed within the bore 13 of torch body 12 and comprises a forwardly extending stem portion 17 which has a diameter slightly less than the diameter of bore 13, to thereby provide an annular passage 18 therebetween. The stem portion 17 terminates at its forward end in a conical valve portion 19 which upon advance of the rod 16 seats in conical recess 20, to thus close orifice 15.

The valve rod 16 further includes a rearwardly extending portion 21 of a diameter somewhat larger than that of stem portion 17. Rod portion 21 is disposed in an enlarged bore portion 22 of body 12 and extends outwardly of the rear end of said body 12 with a handle member 23 affixed to the outer end thereof. The rod portion 21 is threaded at 24 and is screwed into bore portion 22 which is threaded to receive the same. The rod portion 21 is shouldered as at 25 to engage the shouldered juncture 26 of bore portions 13, 22 of body 12, thereby limiting the forward advance of rod 16.

The rod portion 21 is formed with an annular groove immediately rearwardly of the threaded portion 24 to receive a sealing O ring 27, for the purpose hereinafter appearing. The rear end of body 12 is externally threaded to receive a packing gland nut 28 with an interposed packing gland 29 and seal ring 30.

The body 12 is formed with an inlet opening 31 adjacent shoulder 26. The torch 10 is mounted on tank 11 by means of a tube 32 having a reduced upper end portion 33 force fitted into opening 31. The tube 32 is mounted in an outlet tube 34 which is fixed at its lower end in an opening in tank 11. Tube 32 is seated in the upper end of tube 34 with a packing gland nut 35 threaded on an externally threaded portion of tube 34 with an interposed packing gland 36 and seal ring 37. A lock ring 38 fitted into an annular groove on the outer surface of tube 32 abuts the ring 37 to retain the tubes 32, 34 in assembled relation.

The tube 32 is formed with parallel passages 39, 40 which terminate at their upper ends in portions of reduced diameter as at 39A, 40A and which communicate with bore 13. A fuel tube 41 is force fitted at its upper end into a lower portion of passage 40 which is of somewhat enlarged diameter to receive the same.

It is understood, that passage 39 communicates with the air space in the upper portion of tank 11 whereas fuel tube 41 extends downwardly below the level of fuel in said tank. The contents of said tank 11 being under pressure, a mixture of air and liquid fuel will pass to the annular space 18 between rod portion 17 and the bore 13 of body 12 and moves forwardly toward orifice 15.

Means is provided for producing turbulence in such air-fuel mixture and to that end, the forward end of stem portion 17 is formed with grooves 42 which extended over a limited longitudinal portion of stem 17 and terminate at their forward end somewhat short of valve end 19 to leave a smooth stem portion 17A. The usual ignition tube 43 is force fitted on the forward end portion 14 or body 12, the tube 43 having spaced openings 44 therein.

It will be apparent that the effective size of orifice 15 is adjusted by turning handle member 23 to advance or retract valve end 19 in respect to recess 20. The air and oil passing from tank 11 under pressure to annular space 18 is admixed and is in a condition of turbulence by reason of the grooves 42 in stem 17 as the fluid-air mixture encounters the roughened surface portions formed by grooves 42.

It has been found that a very hot, uniform flame may be obtained from the highly atomized mixture of fuel and air issuing from orifice 15 and the flame may be smoothly regulated by adjustment of handle member 23.

If desired, the bore 13 of tubular member 12 may also be roughened in the forward portion thereof, as by forming grooves 45 therein which are in opposed relation to grooves 42 on stem 17, see FIG. 3. It will be noted that the peaks of grooves 42 have an O.D. slightly greater than the diameter of the smooth portion of stem 17 due to the squeezing of the metal by the die used in forming such grooves. However, such peaks still provide a small spacing in relation to the opposed surface portions of bore 13 and the grooves 45, as indicated in FIG. 3.

The roughening or grooving of the forward end portion of stem 17 serves to induce the turbulence which is highly effective in admixing the fuel such as oil or the like, with air and such turbulence may be further enhanced by the roughening or grooving of the forward bore portion. The sealing ring 27 is effective to prevent any leakage of the fuel mixture rearwardly of rod portion 21.

As various changes might be made in the embodiment of the invention herein disclosed without departing from the spirit thereof, it is understood that all matter shown or described herein shall be deemed illustrative and not by way of limitation except as set forth in the appended claims.

What is claimed is:

1. A starting torch comprising a tubular burner body having a longitudinally extending bore and a restricted orifice at one end thereof and communicating with said bore, an elongated rod disposed axially within said bore, cooperating means on opposed rear portions of said rod and bore for rotatably mounting said rod within said bore, said rod including a forwardly extending stem portion having a smooth exterior surface in opposed closely spaced relation to the surface of said bore to provide an annular space therebetween extending toward said orifice, said stem terminating at its forward end in a valve portion for adjustably controlling the effective size of said orifice as said rod is rotated relative to said tubular burner body, said stem including at the forward end thereof a roughened surface portion of limited longitudinal extent, said roughened surface portion comprising a plurality of closely spaced annular grooves, said roughened surface portion being in slightly spaced relation to the opposed surface of said bore and completely out of contact with the bore surface, inlet means on the rear portion of said tubular burner body including a pair of passages at one end thereof communicating with the annular space between said stem portion and the bore of said tubular member and being adapted to be connected respectively at the other ends thereof to a source of fuel and air under pressure, said roughened surface portion of the stem being effective to induce turbulence and admixture of fuel and air passing through said annular space toward said orifice.

2. A starting torch as in claim 1 wherein the peaks of said grooves have a diameter slightly greater than the diameter of the adjacent smooth surfaced portion of said stem, the peaks of said grooves extending toward the inner surface of opposed bore portions and in slightly spaced relation thereto.

3. A starting torch as in claim 1 wherein the bore of said tubular burner body includes a roughened surface portion of limited longitudinal extent and disposed in opposed relation to the roughened surface portion of said stem.

4. A starting torch as in claim 3 wherein the roughened surface portion of said bore comprises annular grooves in closely spaced relation.

References Cited by the Examiner

UNITED STATES PATENTS

| | | | |
|---|---|---|---|
| 432,080 | 7/90 | Reilly | 239—487 |
| 982,106 | 1/11 | Thornycroft | 158—78 |
| 1,146,394 | 7/15 | Best | 239—488 |
| 1,844,653 | 2/32 | Hechenbleikner | 158—73 |
| 2,925,126 | 2/60 | Sadler | 158—76 |
| 2,982,348 | 5/61 | Samothrakis | 158—76 |

JAMES W. WESTHAVER, *Primary Examiner.*

MEYER PERLIN, *Examiner.*